United States Patent [19]

Frazer

[11] 4,399,270

[45] Aug. 16, 1983

[54] FIBER-FORMING POLYESTERS OF KETODIOLS

[75] Inventor: August H. Frazer, Wilmington, Del.

[73] Assignee: E. I. Du Pont de Nemours & Co., Wilmington, Del.

[21] Appl. No.: 402,858

[22] Filed: Jul. 29, 1982

[51] Int. Cl.³ .................... C08G 63/06; C08G 63/18
[52] U.S. Cl. ............................ 528/125; 528/128; 528/190; 528/191; 528/193; 528/194; 528/220; 528/271
[58] Field of Search ............ 528/125, 128, 190, 191, 528/193, 194, 220, 271

[56] References Cited

U.S. PATENT DOCUMENTS

| | | | |
|---|---|---|---|
| 3,073,866 | 1/1963 | Stanley | 260/591 |
| 4,102,864 | 7/1978 | Deex et al. | 528/173 |
| 4,118,372 | 10/1978 | Schaefgen | 528/190 |
| 4,188,476 | 2/1980 | Irwin | 528/128 |
| 4,226,970 | 10/1980 | Frazer | 528/128 |
| 4,232,143 | 11/1980 | Irwin | 528/128 |
| 4,232,144 | 11/1980 | Irwin | 528/128 |
| 4,245,082 | 1/1981 | Irwin | 528/128 |
| 4,269,965 | 5/1981 | Irwin | 528/128 |
| 4,276,226 | 6/1981 | Clement et al. | 260/410.5 |
| 4,335,232 | 6/1982 | Irwin | 528/128 |

Primary Examiner—Lester L. Lee

[57] ABSTRACT

Homopolyesters and copolyesters, of diacids and specific ketodiols, exhibiting melt-anisotropy and being melt-spinnable into oriented filaments that can be heat treated to high tenacity and modulus.

16 Claims, No Drawings

FIBER-FORMING POLYESTERS OF KETODIOLS

DESCRIPTION

Technical Field

This invention relates to fiber-forming, melt-spinnable polyesters that exhibit optical anisotropy in the melt.

BACKGROUND

Aromatic polyesters that form optically anisotropic melts and can be melt-spun into oriented filaments are disclosed in U.S. Pat. No. 4,118,372. The filaments can be heat treated to high tenacity and modulus. The polyesters are prepared primarily from para-oriented dihydric aromatic compounds and para-oriented aromatic dicarboxylic acids.

The use of selected aromatic monoand diketodiols and aromatic dicarboxylic acids in the preparation of polyesters that are optically anisotropic in the melt and can be melt-spun into oriented fibers is disclosed in U.S. Pat. Nos. 4,269,965; 4,245,082; and 4,226,970.

It is an object of this invention to provide novel polyesters. Another object is to provide such polymers that form anisotropic melts and that can be melt-spun into filaments having a high as-spun modulus. A further object is to provide such filaments that can be heat treated to high tenacity and modulus. Other objects will become apparent hereinafter.

DISCLOSURE OF INVENTION

For further comprehension of the invention and of the objects and advantages thereof, reference may be made to the following description and to the appended claims in which the various novel features of the invention are more particularly set forth.

The invention resides in homopolyesters consisting essentially of substantially equimolar amounts of the recurring units

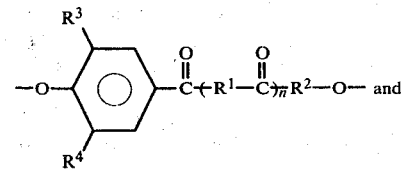
(a)

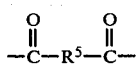
(b)

wherein
$R^1$ is m-phenylene or p-phenylene;
$R^2$ is

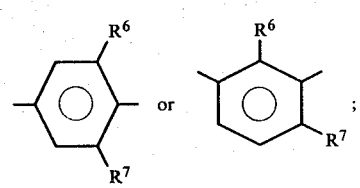

each of $R^3$, $R^4$, $R^6$ and $R^7$ is independently selected from H, $CH_3$ and Cl;
$R^5$ is m-phenylene, p-phenylene, ethylenedioxybis-p-phenylene or p,p'-biphenylene; and
n is 0 or 1;

provided; however:

(aa) when n is 0, $R^2$ is

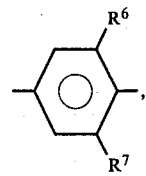

$R^3$ and $R^4$ or $R^6$ and $R^7$ are both Cl and $R^5$ is p-phenylene or ethylenedioxybis-p-phenylene, or $R^2$ is

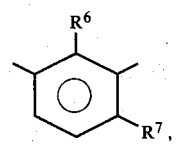

$R^3$, $R^4$, $R^6$ and $R^7$ are H and $R^5$ is ethylenedioxybis-p-phenylene; and (bb) when n is 1, $R^1$ is m-phenylene, $R^2$ is

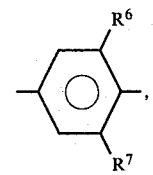

$R^5$ is
ethylenedioxybis-p-phenylene or p, p'-biphenylene, one of $R^3$ and $R^4$ is $CH_3$ or Cl and the other is H, and one of $R^6$ and $R^7$ is $CH_3$ or Cl and the other is H.

The invention also resides in copolyesters consisting essentially of the recurring units

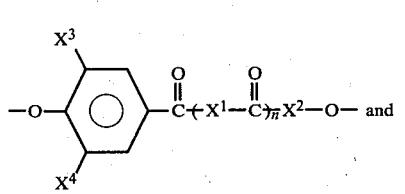
(a)

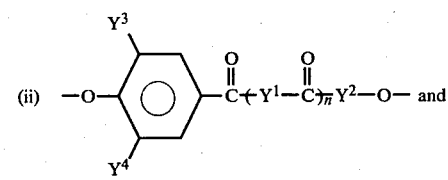
(ii)

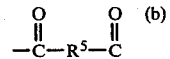
(b)

wherein each of $X^1$ and $Y^1$ is independently selected from m-phenylene and p-phenylene;

$X^2$ is

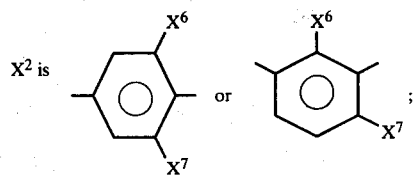

$Y^2$ is

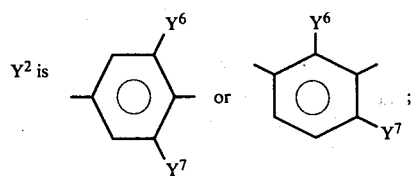

each of $X^3$, $X^4$, $X^6$, $X^7$, $Y^3$, $Y^4$, $Y^6$ and $Y^7$ is independently selected from H, $CH_3$ and Cl;

$R^5$ is m-phenylene, p-phenylene, ethylenedioxybis-p-phenylene or p,p'-biphenylene; and n is 0 or 1, each of the recurring units (i) and (ii) comprising 40 to 60 mol % of their combined amounts which is substantially equimolar with the amount of (b), provided, however:

(aa) when n is 0 and one of $X^2$ and $Y^2$ is attached at the p-phenylene positions and the other is attached at the m-phenylene positions, then $X^3$, $X^4$, $X^6$, $X^7$, $Y^3$, $Y^4$, $Y^6$ and $Y^7$ are H and $R^5$ is p-phenylene or ethylenedioxybis-p-phenylene;

(bb) when n is 0 and $X^2$ and $Y^2$ are both attached at the p-phenylene positions, 1 or 2 of $X^3$, $X^4$, $X^6$ and $X^7$ and 1 or 2 of $Y^3$, $Y^4$, $Y^6$ and $Y^7$ are independently selected from $CH_3$ and Cl, the remaining 2 or 3 of $X^3$, $X^4$, $X^6$ and $X^7$ and the remaining 2 or 3 of $Y^3$, $Y^4$, $Y^6$ and $Y^7$ are H, and $R^5$ is m-phenylene, p-phenylene or ethylenedioxybis-p-phenylene;

(cc) when n is 0, $X^2$ and $Y^2$ are both attached at the p-phenylene positions, and either $X^3$, $X^4$, $X^6$ and $X^7$ are each independently selected from $CH_3$ and Cl and $Y^3$, $Y^4$, $Y^6$ and $Y^7$ are H or $X^3$, $X^4$, $X^6$ and $X^7$ are H and $Y^3$, $Y^4$, $Y^6$ and $Y^7$ are each independently selected from $CH_3$ and Cl, then $R^5$ is m-phenylene.

(dd) when n is 0 and $X^2$ and $Y^2$ are both attached at the m-phenylene positions, 1 or 2 of $X^3$, $X^4$, $X^6$, $X^7$, $Y^3$, $Y^4$, $Y^6$ and $Y^7$ are independently selected from $CH_3$ and Cl, the remaining 6 or 7 of $X^3$, $X^4$, $X^6$, $X^7$, $Y^3$, $Y^4$, $Y^6$ and $Y^7$ are H, and $R^5$ is p-phenylene or ethylenedioxybis-p-phenylene;

(ee) when n is 1, $X^2$ is

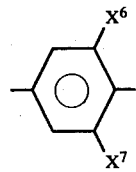

and $Y^2$ is

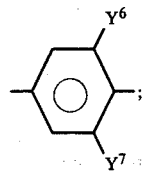

(ff) when n is 1 and $X^1$ and $Y^1$ are both m-phenylene, 6 of $X^3$, $X^4$, $X^6$, $X^7$, $Y^3$, $Y^4$, $Y^6$ and $Y^7$ are independently selected from $CH_3$ and Cl, the remaining 2 of $X^3$, $X^4$, $X^6$, $X^7$, $Y^3$, $Y^4$, $Y^6$ and $Y^7$ are H, and $R^5$ is p,p'-biphenylene; and (gg) when n is 1 and one of $X^1$ and $Y^1$ is m-phenylene and the other is p-phenylene, each of $X^3$, $X^4$, $X^6$, $X^7$, $Y^3$, $Y^4$, $Y^6$ and $Y^7$ is independently selected from $CH_3$ and Cl, or one of each pair $X^3$ and $X^4$, $X^6$ and $X^7$, $Y^3$ and $Y^4$ and $Y^6$ and $Y^7$ is independently selected from $CH_3$ and Cl and the other of each pair is H, and $R^5$ is p,p'-biphenylene.

The invention also resides in shaped articles of the aforesaid polyesters, including molded and extruded articles, examples of the latter being films and filaments.

As the terms are used herein, a homopolyester is the condensation polymer prepared from one diol and one dicarboxylic acid, and a copolyester is the condensation polymer prepared from a diol and a dicarboxylic acid and at least one additional diol and/or dicarboxylic acid. The term "polyester" includes both homopolyester and copolyester.

As the term is used herein, "consisting essentially of" means that the polyester includes the recited essential recurring units. This definition is not intended to preclude the presence of minor amounts (less than 10 mol %) of other recurring units of a nonessential type which do not deleteriously affect the properties, and particularly, the melt-anisotropic behavior, of the polyester.

As indicated above, the invention herein also resides in high modulus filaments of the above polyesters, for example, a modulus of greater than 200 g/denier (177 dN/tex), which filaments can be heat treated to high tenacity, for example, greater than 12 g/denier (10.7 dN/tex), and even higher modulus.

The polyesters of this invention are prepared by means of conventional procedures using appropriate mono or diketodiols and appropriate dicarboxylic acids. The monoketodiol can be prepared by reacting, under anhydrous conditions, the appropriate $R^3/R^4$-, $X^3/X^4$- or $Y^3/Y^4$-substituted phenol and the appropriate hydroxyacid ($HO_2C$-$R^2$-OH, $HO_2C$-$X^2$-OH or $HO_2C$-$Y^2$-OH) in hydrogen fluoride, in the presence of boron trifluoride, at a temperature in about the range 0°-100° C. The diketodiol can be similarly prepared by reacting the appropriate hydroxy acids of the formulas

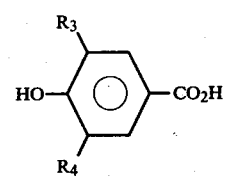

and HO—$R^2$—$CO_2H$ with the appropriate, aromatic hydrocarbon of the formula H-$R^1$-H, or by reacting the appropriate monophenols of the formulas

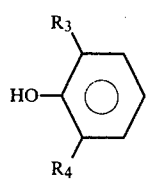

and H-R$^2$-OH with the appropriate dicarboxylic acid of the formula HO$_2$C-R$^1$-CO$_2$H, it being understood that, in all the aforesaid formulas, as is necessary to prepare the desired polyester, R$^1$, R$^2$, R$^3$ and R$^4$ may be replaced with X$^1$ or Y$^1$, X$^2$ or Y$^2$, X$^3$ or Y$^3$ and X$^4$ or Y$^4$, respectively. The reaction can be conveniently carried out on an approximately molar scale, with the reactants being charged to a 1 L shaker tube (Hastalloy ® C) which is then cooled and evacuated. Liquid HF is added, then BF$_3$ in slight excess of such amount as to provide one mole for each mole of water produced and one mole for each mole of carbonyl functionality. The combined amounts of reactants, HF and BF$_3$ total about 700 g. The reaction time is generally about 4 to 18 hours. The product is discharged onto 2 L of ice (no water), then made up to 2.5 L with water and stirred vigorously. If the product is crystalline, it can be recovered by filtration; if it is not, sufficient methylene chloride is added to dissolve the product and, after pH adjustment to 7–8 with aqueous ammonia, the organic phase is separated from the aqueous phase and the product is recovered from the organic phase by evaporation.

Diols prepared by the above procedure can be conveniently purified by conversion to esters, preferably acetate esters, by treatment with the appropriate carboxylic acid anhydride, for example, acetic anhydride. Acetylation of diols is accomplished with acetic anhydride, for example, 4 moles of acetic anhydride/mole of diol, in sufficient acetic acid to ensure adequate fluidity for stirring, for example, 1 to 2 L of acetic acid/mole of diol. The reaction is conveniently run overnight at ambient temperature with acid catalysis, for example, 10 g of trifluoromethanesulfonic acid/mole of diol, or under reflux for 4 h with base catalysis, for example, 80 g of sodium acetate/mole of diol. The base-catalyzed acetylation usually produces purer product. When reaction is complete, the acid catalyst, if present, is neutralized with sodium acetate, and the reaction mixture is diluted to twice its volume with ice and water. Product is isolated by filtration, washed with water, dried, and further purified by crystallization from an appropriate solvent.

As an example, 2,6-dichlorophenol (0.7 mole), m-hydroxybenzoic acid (0.7 mole), BF$_3$ (2.0 moles) and HF (400 g) were reacted in accordance with the above procedure for 4 h at 30° C. The recovered diol product was acetylated as described above, and the 3,5-dichloro-4,3' diacetoxybenzophenone produced was recovered and recrystallized from ethyl acetate/cyclohexane; yield 37%; melting point 115°–116° C.

The polyesters of this invention are capable of forming optically anisotropic melts and exhibit molecular weights and melting points which permit melt-spinning into filaments at temperatures below 400° C. Preferred polyesters of the invention have been melt-spun into filaments which have been heat-treated to increase strength properties.

The polyesters of the invention can be prepared by standard melt polymerization techniques from one or more aromatic dicarboxylic acids of the formula HO$_2$C-R$^5$-CO$_2$H, wherein R$^5$ is defined as above, and one or more appropriate mono- or diketodiols, as defined above, frequently in the diester for, for example, the diacetate. The diphenol and dicarboxylic acids are normally combined in substantially equimolar amounts and heated in a reaction vessel under nitrogen with stirring for about 4 to 24 hours. Temperatures employed for the polymerization (condensation) are above the melting points of the reactants and are generally in the range of 200° to 350° C. The reaction vessel is equipped with means to permit by-product removal while polymerization takes place. A vacuum is normally applied towards the end of the polymerization to facilitate removal or remaining by-products and to complete the polymerization. Polymerization conditions, such as temperature, duration of heating and pressure, can be varied, for example, in the light of the reactants employed and the degree of polymerization desired.

The polyesters can be spun into filaments by conventional melt-spinning techniques. A melt of the polymer is extruded through a spinneret into a quenching atmosphere, for example, air or nitrogen maintained at room temperature, and wound up. Such general spinning conditions are given, for example, in U.S. Pat. No. 4,066,620.

As the term is used herein in the description of the fiber, "as-spun" means that the fiber has not been drawn or heat treated after extrusion and normal windup. The as-spun fibers of this invention can be subjected to heat treatment in an oven to provide high strength fibers which are useful for a variety of industrial applications, such as plastic and rubber reinforcement. In the heat treating process, fiber samples, as skeins or on bobbins, preferably collapsible, Teflon ®-coated, stainless-steel bobbins, are usually heated under various restraints in an oven that is continuously purged by flow of inert gas to remove by-products from the vicinity of the fiber. Temperatures approaching the fusion point, but sufficiently below to prevent interfilament fusion, are employed. Preferably, the maximum temperature is reached in a stepwise fashion.

Inherent viscosity ($\eta_{inh}$) is defined by the commonly used equation $$\eta_{inh} = [\ln(\eta_{rel})/C]$$

wherein $_{rel}$ is the relative viscosity and C is the concentration of polymer in the solvent (0.5 g/100 mL). The relative viscosity ($_{rel}$) is determined by dividing the flow time, in a capillary viscometer, of the dilute solution by the flow time, in the same capillary viscometer, for the pure solvent. Flow times are determined at 30° C., and the solvent is a mixture of, by weight, 7.5% trifluoroacetic acid, 17.5% methylene chloride, 12.5% dichlorotetrafluoroacetone hydrate, 12.5% perchloroethylene and 50% p-chlorophenol.

Fiber tensile properties are reported herein in conventional units, with the corresponding SI units in parenthesis.

Denier: g/9000 m (1.11 dtex)
Tenacity: g/denier (0.89 dN/tex)
Elongation: percent of unstretched length
Modulus: g/denier (0.89 dN/tex)

Measurements were made using established procedures, such as disclosed in U.S. Pat. No. 3,827,998, on fibers that had been conditioned for at least one hour. At least three breaks were averaged. The commonly used Thermooptical Test (TOT), as described, for example, is U.S. Pat. No. 4,066,620, was used and involves heating a polymer sample between crossed (90°) polarizers on the heating stage of a polarizing microscope. Polymers that pass this test (+) are considered to be optically anisotropic in the molten state. The orientation angle was determined according to established procedures, such as disclosed in U.S. Pat. No. 3,671,542.

The following examples are illustrative of the invention. All temperatures are in degrees Celsius unless otherwise indicated. Examples 1A, 1B and 3B include comparative experiments which are outside the invention and which demonstrate that the properties, and particularly melt-anisotropic behavior, of polyesters are not predictable from a consideration of the diester and diacid reactants used to prepare them.

Tables 1 and 2 which follow summarize the homopolyesters and copolyesters prepared in the examples. All symbols have the same meanings as defined in the aforesaid formulas.

TABLE 1

A. Homopolyesters containing dioxy units (a) wherein n is one, $R^1$ is m-phenylene and $R^4$ and $R^7$ are H (Example 3A)

| Prep'n. | $R^3$ | $R^6$ | $R^5$ |
|---|---|---|---|
| O | $CH_3$ | $CH_3$ | p,p'-biphenylene |
| P | $CH_3$ | $CH_3$ | ethylenedioxybis-p-phenylene |
| Q | Cl | Cl | ethylenedioxybis-p-phenylene |
| R | Cl | Cl | p,p'-biphenylene |

B. Homopolyesters containing dioxy units (a) where n is zero and $R^6$ and $R^7$ are H (Example 1A)

| Prep'n. | $R^3$ | $R^4$ | $R^2$ | $R^5$ |
|---|---|---|---|---|
| A | Cl | Cl | p-bridged | p-phenylene |
| B | Cl | Cl | p-bridged | ethylenedioxybis-p-phenylene |
| C | H | H | m-bridged | ethylenedioxybis-p-phenylene |

EXAMPLE 1

Homopolyesters and Copolyester of Monoketodiols and Dicarboxylic Acids

A. Homopolyesters A-C shown in Table 1B and comparative homopolyesters S1 and S2 were prepared using the following procedures. To a glass reactor equipped with a nitrogen inlet and sidearm were added the reactants shown in Table 3. The mixture was heated under a nitrogen atmosphere for about 8 h at 283°, removed from the reactor and ground in a Wiley mill at liquid nitrogen temperature until the particles passed through a 20 mesh (U.S. Sieve Series) screen, and then reheated for 8 h at 283°. The properties of the resulting polyesters are given in Table 4; homopolyesters A-C passed the TOT test (+); homopolyesters S1 and S2 failed TOT (−) and are outside the invention since they do not meet the requirements of the homopolyester proviso (aa).

Similarly, Preparation A was repeated except that isophthalic acid was used in place of terephthalic acid; Preparation A was repeated except that 3-chloro-4,4'-diacetoxybenzophenone was used in place of 3,5-dichloro-4-4'-diacetoxybenzophenone; and Preparation B was repeated except that 3,3',5,5'-tetrachloro-4,4'-diacetoxybenzophenone was used in place of 3,5-dichloro-4,4'-diacetoxybenzophenone. The three homopolyesters so produced failed the TOT test (−) and are outside the invention since they fail to meet the requirements of homopolyester proviso (aa).

B. Copolyester E shown in Table 2B was prepared as described in Part A hereinabove except that the diester used was a 1:1 (molar) mixture of 3,3',5,5'-tetrachloro-4,4'-diacetoxybenzophenone (1.090 g) and 4,4'-diacetoxybenzophenone (0.745 g) and the diacid used was isophthalic acid (0.730 g). The resulting polymer passed the TOT test (+); the properties are given in Table 4.

In place of 3,3',5,5'-tetrachloro-4,4'-diacetoxybenzophenone in preparation E of this Part B there may be

TABLE 2

A. Copolyesters containing dioxy units (a) (i) and (a) (ii) wherein n is one, $Y^1$ is m-phenylene and $R^5$ is p,p'-biphenylene (Example 3B)

| Prep'n. | $X^3$ | $X^4$ | $X^6$ | $X^7$ | $X^1$ | $Y^3$ | $Y^4$ | $Y^6$ | $Y^7$ |
|---|---|---|---|---|---|---|---|---|---|
| S | $CH_3$ | $CH_3$ | $CH_3$ | $CH_3$ | p-phenylene | $CH_3$ | $CH_3$ | $CH_3$ | $CH_3$ |
| T | $CH_3$ | $CH_3$ | $CH_3$ | $CH_3$ | m-phenylene | $CH_3$ | H | $CH_3$ | H |
| U | $CH_3$ | H | $CH_3$ | H | p-phenylene | $CH_3$ | H | $CH_3$ | H |
| V | Cl | Cl | Cl | Cl | p-phenylene | Cl | Cl | Cl | Cl |
| W | Cl | Cl | Cl | Cl | m-phenylene | Cl | H | Cl | H |

B. Copolyesters containing dioxy units (a) (i) and (a) (ii) wherein n is zero and $X^6$ and $X^7$ are H (Examples 1B and 2)

| Prep'n. | $X^3$ | $X^4$ | $X^2$ | $Y^3$ | $Y^4$ | $Y^6$ | $Y^7$ | $Y^2$ | $R^5$ |
|---|---|---|---|---|---|---|---|---|---|
| — | H | H | p-bridged | $CH_3$ | $CH_3$ | $CH_3$ | $CH_3$ | p-bridged | m-phenylene |
| E | H | H | p-bridged | Cl | Cl | Cl | Cl | p-bridged | m-phenylene |
| F | Cl | Cl | p-bridged | $CH_3$ | H | H | H | p-bridged | p-phenylene |
| G | Cl | Cl | p-bridged | $CH_3$ | H | H | H | p-bridged | ethylenedioxybis-p-phenylene |
| H | Cl | Cl | p-bridged | $CH_3$ | $CH_3$ | H | H | p-bridged | p-phenylene |
| I | Cl | Cl | p-bridged | $CH_3$ | $CH_3$ | H | H | p-bridged | ethylenedioxybis-p-phenylene |
| J | H | H | m-bridged | $CH_3$ | H | H | H | m-bridged | p-phenylene |
| K | H | H | m-bridged | $CH_3$ | H | H | H | m-bridged | ethylenedioxybis-p-phenylene |
| L | H | H | m-bridged | $CH_3$ | $CH_3$ | H | H | m-bridged | p-phenylene |
| M | H | H | p-bridged | H | H | H | H | m-bridged | p-phenylene |
| N | H | H | p-bridged | H | H | H | H | m-bridged | ethylenedioxybis-p-phenylene | employed 3,3',5,5'-tetramethyl-4,4'-diacetoxybenzophenone.

Similarly, Preparation E was repeated three times except that terephthalic acid, ethylenedioxybis-p-benzoic acid and 4,4'-bibenzoic acid, respectively, were used in place of isophthalic acid. The three copolyesters so produced failed the TOT test (—) and are outside the invention since they fail to meet the requirements of copolyester proviso (cc).

TABLE 3

| | Diester | | | Diacid | | |
|---|---|---|---|---|---|---|
| Prep'n. | Structure* | wt(g) | mmols | Structure* | wt(g) | mmols |
| A | 1 | 1.835 | 5.0 | 4 | 0.830 | 5.0 |
| B | 1 | 1.468 | 4.0 | 5 | 1.208 | 4.0 |
| C | 2 | 1.192 | 4.0 | 5 | 1.208 | 4.0 |
| S1 | 3 | 1.956 | 6.0 | 4 | 0.996 | 6.0 |
| S2 | 3 | 1.304 | 4.0 | 5 | 1.208 | 4.0 |

*1 = 3,5-dichloro-4,4'-diacetoxybenzophenone
2 = 3,4'-diacetoxybenzophenone
3 = 3,5-dimethyl-4,4'-diacetoxybenzophenone
4 = terephthalic acid
5 = ethylenedioxybis-p-benzoic acid

TABLE 4

| Prep'n. | Inherent Viscosity | PMT(°C.)* | FT(°C.)* |
|---|---|---|---|
| A | 0.86 | — | 350 |
| B | 0.96 | — | 260 |
| C | 0.98 | 310 | 258 |
| E | 0.83 | — | 240 |
| S1 | 0.87 | — | 250 |
| S2 | 0.90 | — | 260 |

*PMT = Polymer melt temperature;
FT = flow temperature

Homopolyester preparation A to C and S1 and S2 and copolyester preparation E were mechanically melt spun, using spinnerets having a single 0.23 mm diameter hole, at spinneret temperatures of 298° to 355°, and the fibers were wound up at speeds of 400 to 1070 m/min; data are given in Table 5A. Tensile properties of single filaments of these fibers were measured at room temperature, as-spun, and after heat treatment on a bobbin, under restraint, in a nitrogen atmosphere at 205° to 300° C. for periods of up to 24 h. Property data are given in Table 5B; the data represent the average of five 2.54 cm breaks. In Table 6 are given the best single-break values obtained after heat-treatment of the same filaments of homopolyesters A-C and copolyester E.

TABLE 5A

| Prep'n. | Spinneret Temperature (°C.) | Wind-Up Speed (m/min) | Denier |
|---|---|---|---|
| A | 355 | 920 | 4 |
| B | 321 | 905 | 2.5 |
| C | 324 | 1050 | 3 |
| E | 328 | 1070 | 4 |
| S1 | 355 | 800 | 4 |
| S2 | 298 | 400 | 4 |

TABLE 5B

| Prep'n. | Fiber Treatment* | Tenacity (g/d) | Elong. (%) | Modulus (g/d) | Orientation Angle |
|---|---|---|---|---|---|
| A | 1 | 4.2 | 2.2 | 290 | 28 |
| | 2 | 17.8 | 2.3 | 620 | |
| B | 1 | 4.6 | 2.7 | 210 | 27 |
| | 2 | 18.9 | 3.1 | 400 | |
| C | 1 | 2.7 | 2.7 | 208 | 30 |
| | 2 | 17.1 | 4.3 | 315 | |
| E | 1 | 4.1 | 2.9 | 210 | 26 |
| | 2 | 18.1 | 2.2 | 500 | |
| S1 | 1 | 2.5 | 6.1 | 175 | 31 |
| | 2 | 9.8 | 3.9 | 160 | |
| S2 | 1 | 2.2 | 12.9 | 87 | 33 |
| | 2 | 5.6 | 6.1 | 87 | |

*1 = as spun;
2 = after heat treatment

TABLE 6

| Prep'n. | Tenacity (g/d) | Elong. (%) | Modulus (g/d) |
|---|---|---|---|
| A | 18.4 | 2.3 | 610 |
| B | 18.9 | 3.1 | 400 |
| C | 17.9 | 4.1 | 320 |
| E | 18.8 | 2.1 | 510 |

Comparative preparations S1 and S2, which were not melt-anisotropic, resulted in relatively weak fibers, the modulus of which could not be improved by heat treatment.

EXAMPLE 2

Copolyesters of Monoketodiols and Dicarboxylic Acids

Copolyesters F-N shown in Table 2B were prepared by the procedure described in Example 1B except that the reactants used were as shown in Table 7. In each preparation two diols in the form of diacetates were used in a molar ratio of 1:1. The resulting polymers had the properties given in Table 8; all passed the TOT test (+).

TABLE 7

| | Diester (1) | | | Diester (2) | | | Diacid | | |
|---|---|---|---|---|---|---|---|---|---|
| Prep'n. | Structure* | wt(g) | mmols | Structure* | wt(g) | mmols | Structure* | wt(g) | mmols |
| F | 1 | 1.101 | 3.0 | 6 | 0.936 | 3.0 | 4 | 0.996 | 6.0 |
| G | 1 | 0.734 | 2.0 | 6 | 0.624 | 2.0 | 5 | 1.208 | 4.0 |
| H | 1 | 0.917 | 2.5 | 3 | 0.815 | 2.5 | 4 | 0.830 | 5.0 |
| I | 1 | 0.734 | 2.0 | 3 | 0.652 | 2.0 | 5 | 1.208 | 4.0 |
| J | 2 | 0.894 | 3.0 | 7 | 0.936 | 3.0 | 4 | 0.996 | 6.0 |
| K | 2 | 0.596 | 2.0 | 7 | 0.624 | 2.0 | 5 | 1.208 | 4.0 |
| L | 2 | 0.894 | 3.0 | 8 | 0.978 | 3.0 | 4 | 0.996 | 6.0 |
| M | 9 | 0.894 | 3.0 | 2 | 0.894 | 3.0 | 4 | 0.996 | 6.0 |

TABLE 7-continued

| | Diester (1) | | | Diester (2) | | | Diacid | | |
|---|---|---|---|---|---|---|---|---|---|
| Prep'n. | Structure* | wt(g) | mmols | Structure* | wt(g) | mmols | Structure* | wt(g) | mmols |
| N | 9 | 0.596 | 2.0 | 2 | 0.596 | 2.0 | 5 | 1.208 | 4.0 |

*1 = 3,5-dichloro-4,4'-diacetoxybenzophenone
2 = 3,4'-diacetoxybenzophenone
3 = 3,5-dimethyl-4,4'-diacetoxybenzophenone
4 = terephthalic acid
5 = ethylenedioxybis-p-benzoic acid
6 = 3-methyl-4,4'-diacetoxybenzophenone
7 = 3-methyl-4,3'-diacetoxybenzophenone
8 = 3,5-dimethyl-4,3'-diacetoxybenzophenone
9 = 4,4'-diacetoxybenzophenone

TABLE 8

| Prep'n. | Inherent Viscosity | PMT(°C.) | FT(°C.) |
|---|---|---|---|
| F | 0.56 | — | 355 |
| G | 0.61 | 280 | 265 |
| H | 0.75 | — | 360 |
| I | 0.82 | — | 320 |
| J | 0.83 | 320 | 280 |
| K | 0.92 | 310 | 250 |
| L | 0.80 | — | 338 |
| M | 0.72 | 355 | 330 |
| N | 0.82 | 320 | 270 |

EXAMPLE 3

Homopolyesters and Copolyesters of Diketodiols and Dicarboxylic Acids

A. Homopolyesters O-R in Table 1A were prepared by the procedure described in Example 1A except that the reactants used were as shown in Table 9. The resulting polymers had the properties given in Table 10; all passed the TOT test (+).

TABLE 9

| | Diester | | | Diacid | | |
|---|---|---|---|---|---|---|
| Prep'n. | Structure* | wt(g) | mmols | Structure* | wt(g) | mmoles |
| O | 10 | 1.507 | 3.5 | 12 | 0.848 | 3.5 |
| P | 10 | 1.507 | 3.5 | 5 | 0.998 | 3.3 |
| Q | 11 | 1.410 | 3.0 | 12 | 0.726 | 3.0 |
| R | 11 | 1.410 | 3.0 | 5 | 0.906 | 3.0 |

*10 = 1,3-bis(3-methyl-4-acetoxybenzoyl)benzene
11 = 1,3-bis(3-chloro-4-acetoxybenzoyl)benzene
5 = ethylenedioxybis-p-benzoic acid
12 = 4,4'-bibenzoic acid

TABLE 10

| Prep'n. | Inherent Viscosity | PMT(°C.) | FT(°C.) |
|---|---|---|---|
| O | 0.38 | 275 | 184 |
| P | 0.41 | 300 | 201 |
| Q | 0.40 | 295 | 200 |
| R | 0.40 | 310 | 205 |

B. Copolyesters S-W shown in Table 2A were prepared by the procedure described in Example 1B except that the reactants used were as shown in Table 11. In each preparation two diols in the form of diacetates were used in a molar ratio of 1:1. The resulting polymers had the properties given in Table 12; all passed the TOT test (+).

Similarly, Preparation S was repeated two times except that terephthalic acid and ethylenedioxybis-p-benzoic acid, respectively, were used in place of 4,4'-bibenzoic acid; and Preparation S was repeated except that 1,3-bis(3-methyl-4-acetoxy-benzoyl)benzene was used in place of 1,3-bis(3,5-dimethyl-4-acetoxybenzoyl)benzene. The three copolyesters so produced failed the TOT test (−) and are outside the invention since they fail to meet the requirements of copolyester proviso (gg).

TABLE 11

| | Diester (1) | | | Diester (2) | | | Diacid | | |
|---|---|---|---|---|---|---|---|---|---|
| Prep'n. | Structure* | wt(g) | mmols | Structure* | wt(g) | mmols | Structure* | wt(g) | mmols |
| S | 13 | 0.757 | 1.65 | 14 | 0.757 | 1.65 | 12 | 0.799 | 3.3 |
| T | 14 | 0.802 | 1.75 | 10 | 0.753 | 1.75 | 12 | 0.848 | 3.5 |
| U | 15 | 0.753 | 1.75 | 10 | 0.753 | 1.75 | 12 | 0.848 | 3.5 |
| V | 16 | 0.810 | 1.5 | 17 | 0.810 | 1.5 | 12 | 0.726 | 3.0 |
| W | 17 | 0.810 | 1.5 | 11 | 0.675 | 1.43 | 12 | 0.726 | 3.0 |

*13 = 1,4-bis(3,5-dimethyl-4-acetoxybenzoyl)benzene
14 = 1,3-bis(3,5-dimethyl-4-acetoxybenzoyl)benzene
15 = 1,4-bis(3-methyl-4-acetoxybenzoyl)benzene
16 = 1,4-bis(3,5-dichloro-4-acetoxybenzoyl)benzene
17 = 1,3-bis(3,5-dichloro-4-acetoxybenzoyl)benzene
10 = 1,3-bis(3-methyl-4-acetoxybenzoyl)benzene
11 = 1,3-bis(3-chloro-4-acetoxybenzoyl)benzene
12 = 4,4'-bibenzoic acid

TABLE 12

| Prep'n. | Inherent Viscosity | PMT(°C.) | FT(°C.) |
|---|---|---|---|
| S | 0.27 | — | 311 |
| T | insoluble | 300 | 181 |
| U | insoluble | — | 326 |
| V | 0.29 | — | 320 |
| W | insoluble | 320 | 200 |

Best Mode for Carrying Out the Invention

The best mode presently contemplated for carrying out the invention is reflected by the homopolyester and copolyester preparations of Example 1.

Industrial Applicability

The applicability of polyesters of high tenacity and modulus is well known in the textile industry. The polyesters of this invention are especially useful in this industry.

Although the above description includes preferred embodiments of the invention, it is to be understood that there is no intent to limit the invention to the precise constructions herein disclosed and that the right is reserved to all changes and modifications coming within the scope of the invention as defined in the appended claims.

I claim:

1. Fiber-forming melt-spinnable polyester that is optically anisotropic in the melt and consists essentially of, respectively:

A. substantially equimolar amounts of the recurring units

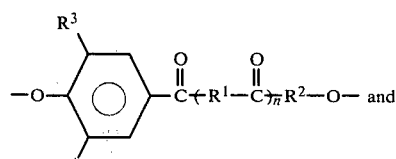 (a)

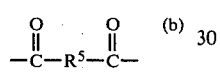 (b)

wherein $R^1$ is m-phenylene or p-phenylene $R^2$ is

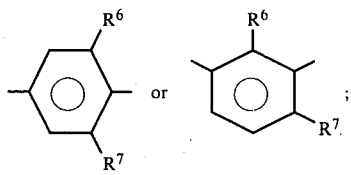

each of $R^3$, $R^4$, $R^6$ and $R^7$ is independently selected from H, $CH_3$ and Cl;
$R^5$ is m-phenylene, p-phenylene, ethylenedioxybis-p-phenylene or p,p'-biphenylene; and
n is 0 or 1; provided, however:

(aa) when n is 0, $R^2$ is

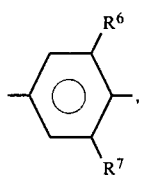

$R^3$ and $R^4$ or $R^6$ and $R^7$ are both Cl and $R^5$ is p-phenylene or ethylenedioxybis-p-phenylene, or $R^2$ is

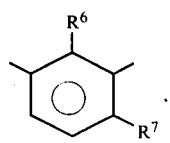

$R^3$, $R^4$, $R^6$ and $R^7$ and H and $R^5$ is ethylenedioxybis-p-phenylene; and (bb) when n is 1, $R^1$ is m-phenylene, $R^2$ is

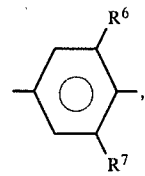

$R^5$ is ethylenedioxybis-p-phenylene or p,p'-biphenylene, one of $R^3$ and $R^4$ is $CH_3$ or Cl and the other is H, and one of $R^6$ and $R^7$ is $CH_3$ or Cl and the other is H; and B. the recurring units

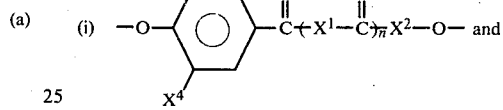 (a)

 (ii)

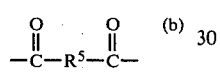 (b)

wherein each of $X^1$ and $Y^1$ is independently selected from m-phenylene and p-phenylene;

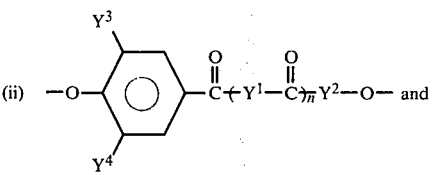

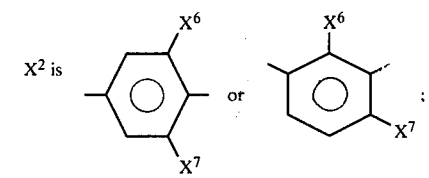

each of $X^3$, $X^4$, $X^6$, $X^7$, $Y^3$, $Y^4$, $Y^6$ and $Y^7$ is independently selected from H, $CH_3$ and Cl;
$R^5$ is m-phenylene, p-phenylene, ethylenedioxybis-p-phenylene or p,p'-biphenylene; and
n is 0 or 1, each of the recurring units (i) and (ii) comprising 40 to 60 mol % of their combined amounts which is substantially equimolar with the amount of (b), provided, however:

(aa) when n is 0 and one of $X^2$ and $Y^2$ is attached at the p-phenylene positions and the other is attached at the m-phenylene positions, then $X^3$, $X_4$, $X^6$, $X^7$, $Y^3$, $Y^4$, $Y^6$ and $Y^7$ are H and $R^5$ is p-phenylene or ethylenedioxybis-p-phenylene;

(bb) when n is 0 and $X^2$ and $Y^2$ are both attached at the p-phenylene positions, 1 or 2 of $X^3$, $X^4$, $X^6$ and $X^7$ and 1 or 2 of $Y^3$, $Y^4$, $Y^6$ and $Y^7$ are independently selected from $CH_3$ and Cl, the remaining 2 or 3 of $X^3$, $X^4$, $X^6$ and $X^7$ and the remaining 2 or 3 of $Y^3$, $Y^4$, $Y^6$ and $Y^7$ are H, and $R^5$ is m-phenylene, p-phenylene or ethylenedioxybis-p-phenylene;

(cc) when n is 0, $X^2$ and $Y^2$ are both attached at the p-phenylene positions, and either $X^3$, $X^4$, $X^6$ and $X^7$ are each independently selected from $CH_3$ and Cl and $Y^3$, $Y^4$, $Y^6$ and $Y^7$ are H or $X^3$, $X^4$, $X^6$ and $X^7$ are H and $Y^3$, $Y^4$, $Y^6$ and $Y^7$ are each independently selected from $CH_3$ and Cl, then $R^5$ is m-phenylene.

(dd) when n is 0 and $X^2$ and $Y^2$ are both attached at the m-phenylene positions, 1 or 2 of $X^3$, $X^4$, $X^6$, $X^7$, $Y^3$, $Y^4$, $Y^6$ and $Y^7$ are independently selected from $CH_3$ and Cl, the remaining 6 or 7 of $X^3$, $X^4$, $X^6$, $X^7$, $Y^3$, $Y^4$, $Y^6$ and $Y^7$ are H, and $R^5$ is is p-phenylene or ethylenedioxybis-p-phenylene;

(ee) when n is 1, $X^2$ is

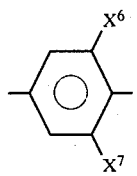

and $Y^2$ is

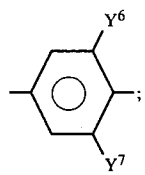

(ff) when n is 1 and $X^1$ and $Y^1$ are both m-phenylene, 6 of $X^3$, $X^4$, $X^6$, $X^7$, $Y^3$, $Y^4$, $Y^6$ and $Y^7$ are independently selected from $CH_3$ and Cl, the remaining 2 of $X^3$, $X^4$, $X^6$, $X^7$, $Y^3$, $Y^4$, $Y^6$ and $Y^7$ are H, and $R^5$ is p,p'-biphenylene; and (gg) when n is 1 and one of $X^1$ and $Y^1$ is m-phenylene and the other is p-phenylene, each of $X^3$, $X^4$, $X^6$, $X^7$, $Y^3$, $Y^4$, $Y^6$ and $Y^7$ is independently selected from $CH_3$ and Cl, or one of each pair of $X^3$ and $X^4$, $X^6$ and $X^7$, $Y^3$ and $Y^4$ and $Y^6$ and $Y^7$ is independently selected from $CH_3$ and Cl and the other of each pair is H, and $R^5$ is p,p'-biphenylene.

2. Hompolyester of claim 1.
3. Homopolyester of claim 2 wherein n is 0, $R_2$ is

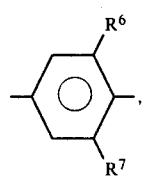

$R^3$ and $R^4$ are both Cl,
$R^5$ is p-phenylene, and
$R^6$ and $R^7$ are both H.

4. Homopolyester of claim 2 wherein n is 0, $R^2$ is

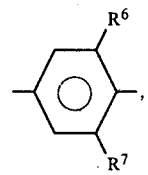

$R^3$ and $R^4$ are both Cl,
$R^5$ is ethylenedioxybis-p-phenylene,
$R^6$ and $R^7$ are both H.

5. Homopolyester of claim 2 wherein n is 0, $R^2$ is

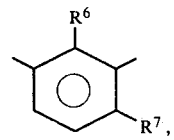

$R^3$, $R^4$, $R^6$ and $R^7$ are H, and
$R^5$ is ethylenedioxybis-p-phenylene.

6. Copolyester of claim 1.
7. Copolyester of claim 6 wherein n is 0, $X^2$ is

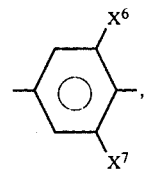

$X^3$, $X^4$, $X^6$ and $X^7$ are H,
$Y^2$ is

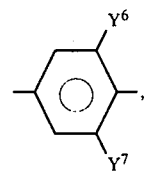

$Y^3$, $Y^4$, $Y^6$ and $Y^7$ are Cl, and
$R^5$ is m-phenylene.

8. Copolyester of claim 6 wherein n is 0, $X^2$ is

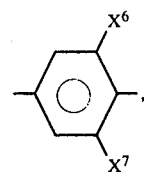

$X^3$, $X^4$, $X^6$ and $X^7$ are H,
$Y^2$ is

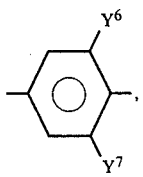, $Y^3$, $Y^4$, $Y^6$ and $Y^7$ are $CH_3$, and
$R^5$ is m-phenylene.
9. Shaped article of the polyester of claim 1.
10. Molded article of the polyester of claim 1.
11. Extruded article of the polyester of claim 1.
12. Film of the polyester of claim 1.
13. Filament of the polyester of claim 1.
14. Filament of the homopolyester of claim 3.
15. Filament of the homopolyester of claim 5.
16. Filament of the copolyester of claim 7.

* * * * *

UNITED STATES PATENT OFFICE
CERTIFICATE OF CORRECTION

PATENT NO. : 4,399,270
DATED : August 16, 1983
INVENTOR(S) : August Henry Frazer It is certified that error appears in the above-identified patent and that said Letters Patent are hereby corrected as shown below:

Column 13, lines 16 and 17, delete ", respectively".
Column 14, line 16, "H; and" should be --H; or--.

Signed and Sealed this

Tenth Day of July 1984

[SEAL]

Attest:

GERALD J. MOSSINGHOFF

Attesting Officer

Commissioner of Patents and Trademarks